United States Patent
Xu et al.

(10) Patent No.: US 10,587,881 B2
(45) Date of Patent: Mar. 10, 2020

(54) METHOD OF DECODED PICTURE BUFFER MANAGEMENT FOR INTRA BLOCK COPY MODE

(71) Applicant: HFI Innovation Inc., Zhubei, Hsinchu County (TW)

(72) Inventors: Xiaozhong Xu, State College, PA (US); Shan Liu, San Jose, CA (US); Chenghao Liu, San Jose, CA (US)

(73) Assignee: HFI Innovation Inc., Zhubei, Hsinchu County (TW)

( * ) Notice: Subject to any disclaimer, the term of this patent is extended or adjusted under 35 U.S.C. 154(b) by 9 days.

(21) Appl. No.: 15/577,237

(22) PCT Filed: May 27, 2016

(86) PCT No.: PCT/CN2016/083737
§ 371 (c)(1),
(2) Date: Nov. 27, 2017

(87) PCT Pub. No.: WO2016/192594
PCT Pub. Date: Dec. 8, 2016

(65) Prior Publication Data
US 2018/0160122 A1 Jun. 7, 2018

Related U.S. Application Data

(60) Provisional application No. 62/183,799, filed on Jun. 24, 2015, provisional application No. 62/182,685, (Continued)

(51) Int. Cl.
*H04N 19/159* (2014.01)
*H04N 19/172* (2014.01)
(Continued)

(52) U.S. Cl.
CPC ......... *H04N 19/159* (2014.11); *H04N 19/107* (2014.11); *H04N 19/117* (2014.11);
(Continued)

(58) Field of Classification Search
CPC ....... H04N 19/593; H04N 19/82; H04N 19/70
See application file for complete search history.

(56) References Cited

U.S. PATENT DOCUMENTS 9,485,505 B2   11/2016  Zhang et al.
2008/0137753 A1*  6/2008  He ...................... H04N 19/139
375/240.24
(Continued)

FOREIGN PATENT DOCUMENTS

CN       103873872 A     6/2014
WO     2015/054811 A1   4/2015

OTHER PUBLICATIONS

International Search Report dated Aug. 24, 2016, issued in application No. PCT/CN2016/083737.
(Continued)

*Primary Examiner* — Rebecca A Volentine
(74) *Attorney, Agent, or Firm* — Oblon, McClelland, Maier & Neustadt, L.L.P.

(57) ABSTRACT

Methods and Apparatus of managing decoded picture buffer for a video decoding system using Intra Block Copy (IBC) mode. In one embodiment, one or more previously reconstructed pictures after in-loop filtering are stored in a DPB (decoded picture buffer). For decoding a current picture, a first and a second picture buffers are allocated in the DPB. Both unfiltered version and filtered version of reconstructed current picture are stored in the first and second picture buffers. After the current picture is decoded, the unfiltered version is removed from the DPB. In another embodiment, an unfiltered version and filtered version of reconstructed
(Continued)

current picture are stored. One of them is stored in the DPB and the other is stored in a temporary buffer. After the current picture is decoded, the unfiltered version is removed from the DPB or the temporary buffer.

22 Claims, 2 Drawing Sheets

Related U.S. Application Data filed on Jun. 22, 2015, provisional application No. 62/168,144, filed on May 29, 2015.

(51) Int. Cl.
| | | |
|---|---|---|
| *H04N 19/82* | (2014.01) | |
| *H04N 19/573* | (2014.01) | |
| *H04N 19/58* | (2014.01) | |
| *H04N 19/117* | (2014.01) | |
| *H04N 19/70* | (2014.01) | |
| *H04N 19/433* | (2014.01) | |
| *H04N 19/107* | (2014.01) | |
| *H04N 19/176* | (2014.01) | |
| *H04N 19/152* | (2014.01) | |
| *H04N 19/423* | (2014.01) | |

(52) U.S. Cl.
CPC ......... *H04N 19/172* (2014.11); *H04N 19/176* (2014.11); *H04N 19/433* (2014.11); *H04N 19/573* (2014.11); *H04N 19/58* (2014.11); *H04N 19/70* (2014.11); *H04N 19/82* (2014.11); *H04N 19/152* (2014.11); *H04N 19/423* (2014.11)

(56) References Cited

U.S. PATENT DOCUMENTS

2009/0147850 A1    6/2009  Pandit

| 2012/0147973 | A1* | 6/2012  | Wu .................. | H04N 19/188 375/240.25 |
| 2013/0215975 | A1* | 8/2013  | Samuelsson ........ | H04N 19/70 375/240.25 |
| 2014/0269899 | A1* | 9/2014  | Park .................. | H04N 19/44 375/240.02 |
| 2015/0063440 | A1* | 3/2015  | Pang ................. | H04N 19/174 375/240.02 |
| 2015/0139296 | A1* | 5/2015  | Yu .................... | H04N 19/103 375/240.02 |
| 2015/0271487 | A1* | 9/2015  | Li ..................... | H04N 19/105 375/240.02 |
| 2015/0271515 | A1* | 9/2015  | Pang ................. | H04N 19/70 375/240.16 |
| 2015/0296213 | A1* | 10/2015 | Hellman ............. | H04N 19/44 375/240.01 |
| 2016/0241868 | A1* | 8/2016  | Li ..................... | H04N 19/56 |
| 2017/0019666 | A1* | 1/2017  | Deshpande .......... | H04N 19/30 |
| 2017/0272744 | A1* | 9/2017  | Liu .................... | H04N 19/105 |

OTHER PUBLICATIONS

Joshi, R., et al.; "High Efficiency Video Coding (HEVC) Screen Content Coding: Draft 3;" Joint Collaborative Team on Video Coding (JCT-VC) of ITU-T SG 16 WP 3 and ISO/IEC JTC 1/SC 29/WG 11; 20th Meeting: Geneva, CH; Feb. 2015; pp. 1-565.

Liu, C., et al.; "On operation of DPB in Screen Content Coding;" Joint Collaborative Team on Video Coding (JCT-VC) of ITU-TSG 16 WP 3 and ISO/IEC JTC 1/SC 29/WG 11; Jun. 2015; pp. 1-4.

Rapaka, K., et al.; "Description of Core Experiment 2 (CE2) Intra block copy memory access;" Joint Collaborative Team on Video Coding (JCT-VC) of ITU-T SG 16 WP 3 and ISO/IEC JTC 1/SC 29/WG 11; Feb. 2015; pp. 1-4.

Rapaka, K., et al.; "HLS: On Intra block copy signaling control;" Joint Collaborative Team on Video Coding (JCT-VC) of ITU-TSG 16 WP 3 and ISO/IEC JTC 1/SC 29/WG 11; Jun. 2015; pp. 1-6.

\* cited by examiner

METHOD OF DECODED PICTURE BUFFER MANAGEMENT FOR INTRA BLOCK COPY MODE

CROSS REFERENCE TO RELATED APPLICATIONS

The present invention claims priority to U.S. Provisional Patent Application, Ser. No. 62/168,144, filed on May 29, 2015, U.S. Provisional Patent Application, Ser. No. 62/182,685, filed on Jun. 22, 2015, and U.S. Provisional Patent Application, Ser. No. 62/183,799, filed on Jun. 24, 2015. The current application is also related to U.S. Provisional Patent Application, Ser. No. 62/167,474, filed on May 28, 2015. The U.S. Provisional Patent Applications are hereby incorporated by reference in their entireties.

FIELD OF THE INVENTION

The present invention relates to video coding using coding modes including Intra-block copy (IntraBC) mode and Inter prediction mode. In particular, the present invention relates to techniques to manage decoded picture buffer (DPB).

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC screen content coding, a new Intra coding mode, named Intra-block copy (IntraBC) has been used.

Intra block copy (IBC) uses reconstructed samples in the current picture before in-loop filter as a reference picture for prediction. This un-filtered picture needs to be stored in addition to the filtered picture after in-loop filter. To store the reconstructed samples before in-loop filter, additional memory and the memory bandwidth is required for reading and writing, respectively. In the case that all reconstructed samples before in-loop filter may be used as the reference for IBC prediction, the whole reconstructed picture before in-loop filter needs to be stored. Hence, both the reconstructed current pictures before in-loop filter and after in-loop filter need to be stored for IBC prediction and r for temporal prediction respectively. Therefore, Intra block copy memory access causes increased memory bandwidth. In addition, it also causes additional decoding picture buffer (DPB).

In order to store the additional reconstructed samples before in-loop filter, Section 8: general decoding process of High Efficiency Video Coding (HEVC) Screen Content Coding (SCC): Draft 3 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005) is modified so that a picture storage buffer in the decoded picture buffer (DPB) is allocated for the current picture. In HEVC SCC: Draft 3, the reconstructed current picture is marked as "used for long-term reference" in case that curr_pic_as_ref_enabled_flag is equal to 1. When curr_pic_as_ref_enabled_flag is equal to 1, the decoded sample values of the reconstructed current picture before in-loop filtering are stored into the picture storage buffer allocated for the current picture. After completing the decoding of all slices, the entire current decoded picture after in-loop filter is stored in the picture storage buffer allocated for the current picture and is marked as "used for short-term reference". In HEVC and the HEVC SCC: Draft 3, the decoded pictures are managed by operation of the decoded picture buffer in Annex C.3 of HEVC SCC: Draft 3, which consists of a set of ordered processes including removal of pictures from the decoded picture buffer (DPB) (i.e., subclause C.3.2), picture output i.e., subclause C.3.3), current decoded picture marking and storage (i.e., subclause C.3.4). However the operation of DPB is not modified appropriately for the scenario that the reconstructed current picture may be used as a reference picture as discussed follows.

The operation of decoded picture buffer specifies when each of the operations happens so that DPB fullness can be controlled appropriately and the DPB fullness does not exceed the DPB maximum size limitation. In the subclause of removal of pictures from the DPB, for each picture that is removed from the DPB, the DPB fullness is decremented by one. In the subclause of current decoded picture marking and storage, the current decoded picture is stored in the DPB in an empty picture storage buffer and the DPB fullness is incremented by one. However, storing of the current picture before in-loop filter and updating of the DPB fullness are not specified in the operation of the DPB, in Annex C.3. Accordingly, the operation of DPB cannot be appropriately managed.

As mentioned in the previous paragraph, there is an issue of introducing additional memory bandwidth for reading and writing the reconstructed samples before in-loop filter to the memory. In the Core Experiment 2 (CE2): Intra block copy memory access in JCTVC-T1102 (Rapaka, et al., Description of Core Experiment 2 (CE2): Intra block copy memory access, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1102), the memory bandwidth reduction is evaluated in order to avoid causing one additional picture memory buffer and bandwidth for reading and writing reconstructed samples before in-loop filter in addition to the samples after in-loop filter. The reconstructed samples before in-loop filter are also referred as unfiltered reconstructed samples in this disclosure. The reconstructed samples after in-loop filter are also referred as filtered reconstructed samples in this disclosure.

Two categories of works are under progress to address this issue. In the first category, JCTVC-S0145 (Rapaka, et al., *Bandwidth reduction method for intra block copy*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0145) discloses a method to reduce average bandwidth when Intra block copy (IBC) mode is used for prediction. JCTVC-S0145 is based on the observation that not all previously unfiltered decoded samples of the current picture are used for prediction in IBC mode. In JCTVC-S0145, the method indicates which of the previously decoded coded tree blocks (CTBs) are used for IBC prediction. According to JCTVC-S0145, a flag is sent for each block in a slice header, which CTBs need to be stored for reducing average bandwidth when a picture parameter set (PPS) level flag indicating the presence of the former flags in slice header. However, the method of JCTVC-S0145 has been questioned regarding know how many CTBs are needed in a slice and how many flags are needed to send in advance. Furthermore, DPB management method is not included in JCTVC-S0145. It is not clear whether the reconstructed samples before in-loop filter are stored in memory buffer in the DPB or outside DPB.

In the second category, JCTVC-T0045 (Lainema, et al., *AHG10: Memory bandwidth reduction for intra block copy*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0045) and JCTVC-T0051 (Laroche, et al., *AHG10: On IBC memory reduction*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0051) disclose a method to store either reconstructed samples before in-loop filter or after in-loop filter by indicating which CTBs are used for IBC prediction to address the issue of increased bandwidth and storage related IBC. The general interest is to keep the memory bandwidth of IBC under the limit as specified HEVC Inter mode. It means only one reconstructed picture buffer can be used for each picture even in the scenario of IBC. JCTVC-T0051 also discloses a method to store either reconstructed samples before in-loop filter or after in-loop filter in a picture memory buffer, which are typically outside DPB. The operation of DPB in Annex C.3 of JCTVC-T1005 may be managed similar to that in HEVC version 1 as discussed follows. In addition, in JCTVC-T0051, the current and the previous CTBs are always considered as available for IBC prediction. Therefore, additional memory for storing the two additional CTBs is required in JCTVC-T0051.

If the memory buffer outside the DPB stores the reconstructed samples before in-loop filter, there will be a bitstream consistency issue in HEVC SCC Draft, which specifies that all reference pictures shall be present in the DPB when needed for prediction. The reason is that the current picture before in-loop filter is used as reference picture and inserted in a reference picture list as HEVC SCC: Draft 3.

In High Level Syntax, the current picture is placed after all short term reference pictures and all other long term reference pictures during the initialization of reference picture list construction. The related descriptions are listed below for List 0. Similar process can be applied for List 1.

At the beginning of the decoding process for each slice, the reference picture list RefPicList0 for P slices and, both reference picture lists RefPicList0 and RefPicList1 for B slices are derived as follows:

TABLE 1

At the beginning of the decoding process for each slice, the reference picture lists RefPicList0 and RefPicList1 (used for B slices) are derived as follows:
    NumRpsCurrTempList0 is set to Max( num_ref_idx_l0_active_minus1 + 1, NumPicTotalCurr ) and the list RefPicListTemp0 is constructed as follows:
    rIdx = 0
    while( rIdx < NumRpsCurrTempList0 ) {
        for( i = 0; i < NumPocStCurrBefore && rIdx < NumRpsCurrTempList0; rIdx++, i++ )
            RefPicListTemp0[ rIdx ] = RefPicSetStCurrBefore[ i ]
        for( i = 0; i < NumPocStCurrAfter && rIdx < NumRpsCurrTempList0; rIdx++, i++ )
            RefPicListTemp0[ rIdx ] = RefPicSetStCurrAfter[ i ]
        for( i = 0; i < NumPocLtCurr && rIdx < NumRpsCurrTempList0; rIdx++, i++ )
            RefPicListTemp0[ rIdx ] = RefPicSetLtCurr[ i ]
        if( curr_pic_as_ref_enabled_flag )
            RefPicListTemp0[ rIdx++ ] = currPic
    }

In Table 1, curr_pic_as_ref_enabled_flag equal to 1 specifies a picture referring to the SPS (sequence parameter set) may be included in a reference picture list of the picture itself curr_pic_as_ref_enabled_flag equal to 0 specifies that a picture referring to the SPS is never included in any reference picture list of the picture itself. When not present, the value of curr_pic_as_ref_enabled_flag is inferred to be equal to 0.

After the initialization, the reference picture list RefPicList0 is constructed as follows:

for(rIdx=0; rIdx<=num_ref_idx_l0_active_minus1; rIdx++)

RefPicList0[rIdx]=ref_pic_list_modification_flag_l0?

RefPicListTemp0[list_entry_l0[rIdx] ]:RefPicListTemp0[rIdx]

However, when the number of active reference pictures (i.e., num_ref_idx_l0_active_minus1+1) is smaller than the number of reference pictures in the list (NumRpsCurrTempList0) associated with the RefPicListTemp0 array storing the current picture, the current picture may not be included in the active reference picture list.

In a coding system based on the existing HEVC, there is an issue associated with Decoded Picture Buffer (DPB) management for IntraBC. When IntraBC is used, the reconstructed portion of current picture may be used as a reference picture to predict current picture. This reference picture for IntraBC is referred as "the unfiltered version of current picture". On the other hand, the version of current picture that will eventually go through filtering operations such as deblocking and SAO is referred to the filtered version of current picture.

A reference picture has to be in Decoded Picture Buffer (DPB) in order to be used by a current picture. The size of DPB is constrained to be MaxDpb Size, which is derived as shown in Table 2.

TABLE 2

```
if( PicSizeInSamplesY <= ( MaxLumaPs >> 2 )
    MaxDpbSize = Min( 4 * maxDpbPicBuf, 16 )
else if( PicSizeInSamplesY <= ( MaxLumaPs >> 1 )
    MaxDpbSize = Min( 2 * maxDpbPicBuf, 16 )
else if( PicSizeInSamplesY <= ( ( 3 * MaxLumaPs ) >> 2 ) )
    MaxDpbSize = Min( ( 4 * maxDpbPicBuf) / 3, 16 )
Else
    MaxDpbSize = maxDpbPicBuf
```

In Table 2, MaxLumaPs is the maximum luma picture size and maxDpbPicBuf is the maximum DPB size, such as 6. However, there are some issues in the current DPB management operations when IntraBC is used.

BRIEF SUMMARY OF THE INVENTION

Methods and Apparatus of managing decoded picture buffer for a video decoding system are disclosed, where the video decoding system uses coding modes including an Inter prediction mode and a Intra Block Copy (IBC) mode. In one embodiment, one or more previously reconstructed pictures after in-loop filtering are stored in a DPB (decoded picture buffer). For decoding a current picture, a first picture buffer and a second picture buffer are allocated in the DPB. After one or more reconstructed image units associated with the current picture are derived from the video bitstream, the reconstructed image units before the in-loop filtering are stored in the first picture buffer and the reconstructed image units after the in-loop filtering are stored in the second picture buffer. If a current reconstructed image unit is coded in the IBC mode, the current reconstructed image unit is reconstructed using the reconstructed image units before the in-loop filtering in the first picture buffer to derive IBC prediction. If the current reconstructed image unit is coded in the Inter prediction mode, the current reconstructed image unit is reconstructed using the previously reconstructed pictures after the in-loop filtering in the DPB to derive Inter prediction.

The first picture buffer and the second picture buffer are allocated in the DPB before the current picture is decoded. The DPB buffer fullness is incremented by one each time when either the first picture buffer or the second picture buffer is allocated in the DPB. Furthermore, the first picture buffer is marked to indicate that the first picture buffer is used for long-term reference and the second picture buffer is marked to indicate that the second picture buffer is used for short-term reference.

The first picture buffer allocated is removed from the DPB after the current picture is reconstructed. On the other hand, the second picture buffer allocated stays in the DPB and is used as a short term reference picture for decoding of subsequent pictures. The DPB buffer fullness is decremented by one when the first picture buffer allocated is removed from the DPB. A variable to indicate a maximum DPB buffer size can remain to be the same as the maximum DPB buffer size specified for High Efficiency Video Coding (HEVC) Screen Content Coding (SCC) Draft 3.

In another embodiment, a first picture buffer and a second picture buffer are allocated in the DPB or in a temporary buffer outside the DPB, where one of the first picture buffer and the second picture buffer is in the DPB and one of the other is in the temporary buffer outside the DPB. The first picture buffer and the second picture buffer are allocated before the current picture is decoded. The DPB buffer fullness is incremented by one when the first picture buffer or the second picture buffer is placed into the DPB. If the first picture buffer is allocated in the DPB, the first picture buffer allocated is removed from the DPB after the current picture is reconstructed, and the DPB buffer fullness is decremented by one when the first picture buffer allocated is removed from the DPB. The second picture buffer is then placed into the DPB and the DPB buffer fullness is incremented by one. If the first picture buffer is allocated in the temporary buffer outside the DPB, the first picture buffer is removed from the temporary buffer after the current picture is reconstructed. The second picture buffer allocated stays in the DPB after the current picture is reconstructed.

DETAILED DESCRIPTION OF THE INVENTION

Figure 1:
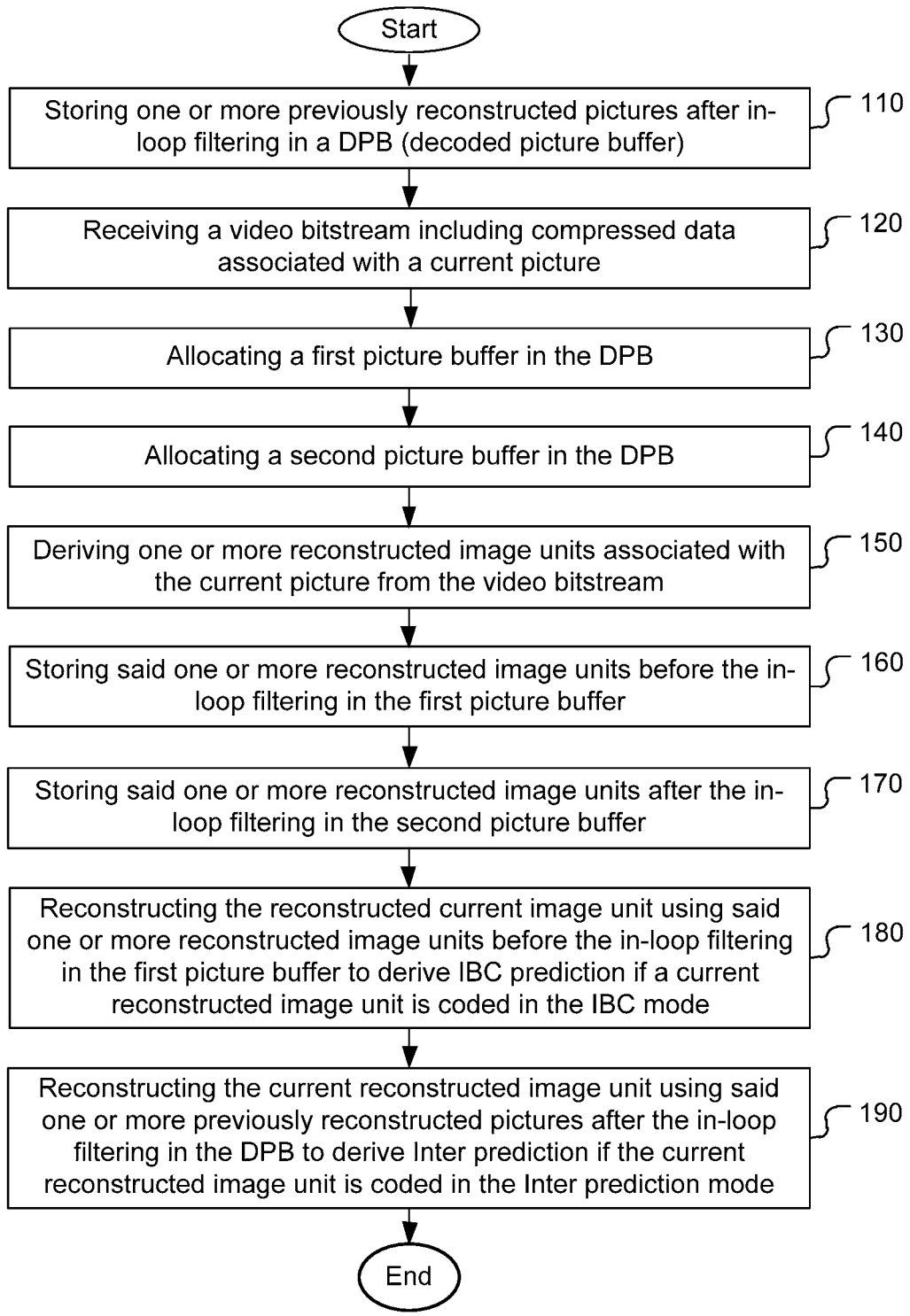
FIG. 1 illustrates a flowchart of an exemplary coding system using coding modes including IntraBC mode (Intra-block copy mode) and Inter prediction mode according to an embodiment of the present invention, where two picture buffers are allocated in the decoded picture buffer (DPB) to store the current reconstructed picture after in-loop filtering and the current reconstructed picture before in-loop filtering.

The following description is of the best-contemplated mode of carrying out the invention. This description is made for the purpose of illustrating the general principles of the invention and should not be taken in a limiting sense. The scope of the invention is best determined by reference to the appended claims.

As discussed above, the reference data for Intra Block Copy (IntraBC or IBC) has to be stored in the reconstructed data is unfiltered. On the other hand, the reference data for Inter prediction have to be stored in a filtered version (i.e., reconstructed and filtered). The present invention discloses modifications of the DPB (decoded picture buffer) operations and bitstream conformance in IBC.

First Method.

This method allocates a picture buffer in the DPB for storing reconstructed samples before in-loop filter. In this case, DPB operation is modified so that the DPB operation is managed appropriately when the current picture is included in a reference picture list. In general, the modification consists of updating of the DPB fullness and defining the time instant of updating the DPB fullness if the current picture is included in a reference picture list.

First Embodiment

The embodiment can be applied to the system as specified in HEVC SCC: Draft 3. There are a few sections in HEVC SCC: Draft 3 (i.e., JCTVC-T1005) need to be modified. Specifically, a subclause C.3.5 related to current decoded picture before in-loop filter storage is added, where the DPB fullness is increased by 1 when the current picture is included in a reference picture list. The process defined in subclause C.3.5 of JCTVC-T1005 occurs instantaneously at the CPB (Coded Picture Buffer) removal time of access unit n, CpbRemovalTime[n], when the current picture is included in a reference picture list. The process is invoked once per picture before decoding of the current picture, but after parsing the header of the first slice segment header of the current picture.

When the current picture is included in a reference picture list, current decoded picture marking and storage as described in subclause C.3.4 and picture decoding, marking, additional bumping and storage as described in C.5.2.3 of HEVC SCC: Draft 3 are modified in a way that the DPB fullness remains unchanged if the current picture is included in a reference picture list.

When the current picture is included in a reference picture list, a decoding process for decoding the current decoded reference picture is added in subclause 8.X, which needs to be invoked once per picture after the processing of C.3.5, which specifies processing of the current decoded picture before in-loop filter storage. When subclause 8.X is invoked, the PicOrderCntVal for the generated picture is set equal to POC of the current picture.

Exemplary HEVC SCC: Draft 3 Changes According to the First Embodiment.

The current HEVC SCC: Draft 3 can be modified to support the first embodiment mentioned above. In particular, new subclauses 3.5 and 3.6 are added to address (a) current decoded picture marking and storage and (b) current decoded picture before in-loop filter storage. Also, the current subclause 5.2.3, entitled "Picture decoding, marking, additional bumping and storage" is modified. In addition, subclause 8.1.3, entitled "Decoding process for a coded picture with nuh_layer_id equal to 0" is modified and subclause 8.X is added. These changes are described as follows.

C.3.5 Regarding Current Decoded Picture Marking and Storage

The process specified in this subclause happens instantaneously at the CPB removal time of access unit n, CpbRemovalTime[n].

If curr_pic_as_ref_enabled_flag is equal to 0, the current decoded picture is stored in the DPB in an empty picture storage buffer, the DPB fullness is incremented by one, and the current picture is marked as "used for short-term reference".

Otherwise, if curr_pic_as_ref_enabled_flag is equal to 1, DPB fullness keeps unchanged. In addition, as specified in subclause 8.1.3, the current decoded picture is stored in the DPB in the picture storage buffer, which is allocated for the current picture and is marked as "used for short-term reference".

C.3.6 Current Decoded Picture Before in-Loop Filter Storage

When curr_pic_as_ref_enabled_flag is equal to 1, the process specified in this subclause occurs instantaneously at the CPB removal time of access unit n, CpbRemovalTime[n]. The process is invoked once per picture before decoding of the current picture but after parsing the header of the first slice segment of the current picture.

The DPB fullness is incremented by 1.

The changes in subclauses C.5.2.3 and 8.1.3 from the current HEVC SCC: Draft 3 are indicated, where inserted text is shown in Italic style and deleted text is enclosed by an asterisk pair within a bracket pair (i.e., [*deleted text*]).

C.5.2.3 Picture Decoding, Marking, Additional Bumping and Storage

The processes specified in this subclause occurs instantaneously when the last decoding unit of access unit n containing the current picture is removed from the CPB.

When the current picture has PicOutputFlag equal to 1, for each picture in the DPB that is marked as "needed for output" and follows the current picture in output order, the associated variable PicLatencyCount is set equal to PicLatencyCount+1.

The current picture is considered as decoded after the last decoding unit of the picture is decoded. If curr_pic_as_ref_enabled_flag is equal to 0, the current decoded picture is stored in an empty picture storage buffer in the DPB. Otherwise, if curr_pic_as_ref_enabled_flag is equal to 1, DPB fullness keeps unchanged. In addition, as specified in subclause 8.1.3, the current decoded picture is stored in the DPB in the picture storage buffer, which is allocated for the current picture and is marked as "used for short-term reference". And the following applies:

If the current decoded picture has PicOutputFlag equal to 1, it is marked as "needed for output" and its associated variable PicLatencyCount is set equal to 0.

Otherwise (the current decoded picture has PicOutputFlag equal to 0), it is marked as "not needed for output".

The current decoded picture is marked as "used for short-term reference".

When one or more of the following conditions are true, the "bumping" process specified in clause C 5.2.4 is invoked repeatedly until none of the following conditions are true:

The number of pictures in the DPB that are marked as "needed for output" is greater than sps_max_num_reorder_pics[HighestTid].

sps_max_latency_increase_plus1[HighestTid] is not equal to 0 and there is at least one picture in the DPB that is marked as "needed for output" for which the associated variable PicLatencyCount that is greater than or equal to SpsMaxLatencyPictures[HighestTid].

8.1.3 Decoding Process for a Coded Picture with nuh_layer_id equal to 0

. . .

The decoding process operates as follows for the current picture CurrPic:

1. The decoding of NAL units is specified in subclause 8.2.

2. The processes in subclause 8.3 specify the following decoding processes using syntax elements in the slice segment layer and above:

Variables and functions relating to picture order count are derived in subclause 8.3.1. This needs to be invoked only for the first slice segment of a picture.

The decoding process for RPS in subclause 8.3.2 is invoked, wherein reference pictures may be marked as "unused for reference" or "used for long-term reference". This needs to be invoked only for the first slice segment of a picture.

When curr_pic_as_ref_enabled_flag is equal to 1, a picture storage buffer in the DPB is allocated for the current picture, and the DPB fullness is increased by 1 as specified in C.3.5 (Current decoded picture before in-loop filter storage), and the current picture is marked as "used for long-term reference".

When curr_pic_as_ref_enabled_flag is equal to 1, general decoding process for generating the current decoded reference picture specified in Section 8.X is invoked, which needs to be processed once per picture after processing C.3.5 (Current decoded picture before in-loop filter storage).

When the current picture is a broken link access (BLA) picture or is a clean random access (CRA) picture with NoRaslOutputFlag equal to 1, the decoding process for generating unavailable reference pictures specified in subclause 8.3.3 is invoked, which needs to be invoked only for the first slice segment of a picture.

. . .

8.X Decoding Process for Current Decoded Reference Picture

When curr_pic_as_ref_enabled_flag is equal to 1, this process is invoked once per coded picture after processing C.3.5 and prior to the decoding process for reference picture lists construction specified in subclause 8.3.4 by applying following process:

The value of PicOrderCntVal for the generated picture is set equal to POC of the current picture.

Second Embodiment

In the second embodiment, a new subclause C.3.5 related to current decoded picture before in-loop filter storage is added, where the DPB fullness is incremented by 1 when the current picture is included in a reference picture list.

When the current picture is included in a reference picture list for decoding slices of the current picture, a general decoding process for decoding the current decoded reference picture is added in subclause 8.X, which consists of two steps of decoding processes.

In the first step, the PicOrderCntVal for the generated picture is set equal to picture order count (POC) of the current picture, which needs to be processed once per picture after processing C.3.5.

In the second step, the value of PicOutputFlag for the picture is set equal to 0 and the current picture before in-loop filter is marked as "unused for reference", which is invoked once per picture after decoding of the last decoding unit of the picture and prior to parsing the first slice segment header of the next picture.

With the second step of decoding process, the current picture before in-loop filter in DPB will be removed from the DPB when the removal of pictures from the DPB (subclause C.3.2) is processed. Current decoded picture marking and storage (subclause C.3.4) and picture decoding, marking, additional bumping and storage (subclause C.5.2.3) do not need to be modified.

The embodiment can be applied to the system as specified in HEVC SCC: Draft 3.HEVC SCC as follows. The changes in subclauses 8.13 from the current HEVC SCC: Draft 3 are indicated, where inserted text is shown in Italic style and deleted text is enclosed by an asterisk pair within a bracket pair (i.e., [*deleted text*]).

C.3.5 Current Decoded Picture Before in-Loop Filter Storage

When curr_pic_as_ref_enabled_flag is equal to 1, the process specified in this subclause happens instantaneously at the CPB removal time of access unit n, CpbRemovalTime[n]. The process is invoked once per picture before decoding of the current picture but after parsing the header of the first slice segment of the current picture.

The DPB fullness is incremented by 1.

8.1.3 Decoding Process for a Coded Picture with nuh_layer_id equal to 0

. . .

The decoding process operates as follows for the current picture CurrPic:

1. The decoding of NAL units is specified in subclause 8.2.

2. The processes in subclause 8.3 specify the following decoding processes using syntax elements in the slice segment layer and above:

Variables and functions relating to picture order count are derived in subclause 8.3.1 This needs to be invoked only for the first slice segment of a picture.

The decoding process for RPS in subclause 8.3.2 is invoked, wherein reference pictures may be marked as "unused for reference" or "used for long-term reference". This needs to be invoked only for the first slice segment of a picture.

When curr_pic_as_ref_enabled_flag is equal to 1, a picture storage buffer in the DPB is allocated for the current picture, and the DPB fullness is increased by 1 as specified in C.3.5, and the current picture is marked as "used for long-term reference".

When curr_pic_as_ref_enabled_flag is equal to 1, decoding process of step 1 for current decoded reference picture specified in Section 8.X.1 is invoked, which needs to be processed once per picture after processing of C.3.5 (Current decoded picture before in-loop filter storage).

When the current picture is a BLA picture or is a CRA picture with NoRaslOutputFlag equal to 1, the decoding process for generating unavailable reference pictures specified in subclause 8.3.3 is invoked, which needs to be invoked only for the first slice segment of a picture.

PicOutputFlag is set as follows:
      If the current picture is a RASL picture and NoRaslOutputFlag of the associated TRAP picture is equal to 1, PicOutputFlag is set equal to 0.
      Otherwise, PicOutputFlag is set equal to pic_output_flag.

At the beginning of the decoding process for each P or B slice, the decoding process for reference picture lists construction specified in subclause 8.3.4 is invoked for derivation of reference picture list 0 (RefPicList0) and, when decoding a B slice, reference picture list 1 (RefPicList1), and the decoding process for collocated picture and no backward prediction flag specified in subclause 8.3.5 is invoked for derivation of the variables ColPic and NoBackwardPredFlag.

3. The processes in subclauses 8.4 through 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each forms a partitioning of the picture. When curr_pic_as_ref_enabled_flag is equal to 1, the decoded sample values of the current picture before in-loop filtering are stored into the picture storage buffer allocated for the current picture.

4. After all slices of the current picture have been decoded and prior to parsing the first slice segment header of the next picture, decoding process of step 2 for current decoded reference picture specified in 8.X2 is invoked when curr_pic_as_ref_enabled_flag is equal to J.

5. After all slices of the current picture have been decoded, the current decoded picture [*entire current decoded picture after in-loop filtering is stored into the picture storage buffer allocated for the current picture and*] is marked as "used for short-term reference".

8.X General Decoding Process for Current Decoded Reference Picture

When curr_pic_as_ref_enabled_flag is equal to 1, the processes specified in subclause 8.X.1 and 8.X.2 are invoked.

8.X.1 Decoding Process of Step 1 for Current Decoded Reference Picture

This process is invoked once per coded picture after processing C.3.5 and prior to the decoding process for reference picture lists construction specified in subclause 8.3.4 when curr_pic_as_ref_enabled_flag is equal to 1 by applying following process:

The value of PicOrderCntVal for the generated picture is set equal to POC of the current picture.

8.X.2 Decoding Process of Step 2 for Current Decoded Reference Picture

This process is invoked once per picture, after decoding of the last decoding unit of a picture and prior to decoding first slice of the next picture when curr_pic_as_ref_enabled_flag is equal to 1. If there is decoded picture whose picture order count is equal to PocStCurr, the value of PicOutputFlag for the picture is set equal to 0.

the decoded picture is marked as "unused for reference".

In the second embodiment, curr_pic_as_ref_enabled_flag in SPS is served as a flag of indicating whether or not the current picture may be included in a reference picture list. The indication of whether the current picture is included in a reference picture list can be indicated by a syntax element named curr_pic_in_ref_list_flag present in PPS level or/and slice segment header level as described in a U.S. Provisional Patent Application, Ser. No. 62/167,474, filed on May 28, 2015.

Third Embodiment

In the third embodiment, the operation of DPB is modified in a way that the curr_pic_in_ref_list_flag present in PPS level or/and slice segment header level is served as a flag of invoking of the modified operations as compared to the curr_pic_as_ref_enabled_flag present in SPS. In other words, curr_pic_as_ref_enabled_flag in SPS in the previously described modifications can be replaced with curr_pic_in_ref_list_flag present in PPS level or/and slice segment header level. In another embodiment of the proposed method 1, for example, Annex C.3.5 as disclosed above can be modified as follows, and other parts of Annexes and Sections could be modified accordingly by replacing curr_pic_as_ref_enabled_flag with curr_pic_in_ref_list_flag.

C.3.5 Current Decoded Picture Before in-Loop Filter Storage

When curr_pic_in_ref_list_flag is equal to 1, the process specified in this subclause happens instantaneously at the CPB removal time of access unit n, CpbRemovalTime[n]. The process is invoked once per picture before decoding of the current picture but after parsing the header of the first slice segment of the current picture.

The DPB fullness is incremented by 1.

A syntax element curr_pic_in_ref_list_flag present in slice segment header indicates whether the current picture is included in a reference picture list as described in another provisional patent application ATDI-15-049PUS. In one semantics of the curr_pic_in_ref_list_flag present in slice segment header as described in U.S. Provisional Patent Application, Ser. No. 62/167,474, filed on May 28, 2015, the curr_pic_in_ref_list_flag present in slice segment headers of a coded picture shall be an identical value either 0 or 1 for all the slice segment headers of a coded picture. In another semantics of the curr_pic_in_ref_list_flag present in slice segment header as described in U.S. Provisional Patent Application, Ser. No. 62/167,474, filed on May 28, 2015, the curr_pic_in_ref_list_flag present in slice segment headers of a coded picture may be different. In the latter case, it causes problems in Annex C.3.5 regarding the operation of DPB as it is invoked once per picture before decoding of the current picture but after parsing the header of the first slice segment of the current picture. Considering a case that for the first slice segment, the current picture is not included in a reference picture list and for the one or multiple remaining slice segment(s), the current picture is included in a reference picture list. In such a case, if the curr_pic_in_ref_list_flag present in the first slice segment header of a picture is used as the condition to decide, whether or not to perform the operation defined in Annex C.3.5, then the operation of the DPB will not operate appropriately in terms of updating DPB fullness.

In this invention, a syntax element named curr_pic_in_dpb_flag is added in the first slice segment header to indicate for at least one of the slice segments of a picture, the current picture is included in a reference picture list to address the above discussed problem. The following table illustrates an example to incorporate the syntax element curr_pic_in_dpb_flag in a slice segment header.

TABLE 3

| slice_segment_header( ) { | Descriptor |
|---|---|
| first_slice_segment_in_pic_flag | u(1) |
| ... | |
| if( first_slice_segment_in_pic_flag ) { | |
| curr_pic_in_dpb_flag | u(1) |
| } | |
| ... | |
| } | |

Fourth Embodiment

In this embodiment, the operation of DPB is modified in a way that the curr_pic_in_dpb_flag present in the first slice of the segment header is served as a flag of invoking the modified operations in method 1, as compared to the curr_pic_as_ref_enabled_flag present in SPS. In other words, the curr_pic_as_ref_enabled_flag in SPS in the modifications of method 1 can be replaced with the curr_pic_in_dpb_flag present in the first slice segment header. For example, Annex C.3.5 can be modified as follows, and other parts of Annexes and Sections can be modified accordingly by replacing curr_pic_as_ref_enabled_flag with the curr_pic_in_dpb_flag.

C.3.5 Current Decoded Picture Before in-Loop Filter Storage

When curr_pic_in_dpb_flag present in the first slice segment header is equal to 1, the process specified in this subclause happens instantaneously at the CPB removal time of access unit n, CpbRemovalTime[n]. The process is invoked once per picture before decoding of the current picture but after parsing the header of the first slice segment of the current picture.

The DPB fullness is increased by 1.

Alternatively, the semantics of the curr_pic_as_ref_enabled_flag present in SPS can be modified as compared to HEVC SCC: Draft 3 as follows:

curr_pic_as_ref_enabled_flag equal to 1 specifies a picture referring to the SPS is included in a reference picture list for at least one of the slice segments of the picture itself. curr_pic_as_ref_enabled_flag equal to 0 specifies that a picture referring to the SPS is not included any reference picture list for any slice segment of the picture itself. When not present, the value of curr_pic_as_ref_enabled_flag is inferred to be equal to 0.

The DPB operation is processed as same as the first embodiment. However, the semantics of the curr_pic_as_ref_enabled_flag is changed as described above.

In addition, slice level syntax curr_pic_in_ref_list_flag is added in each slice segment header of a picture to indicate whether or not the current picture is included in a reference picture list of the picture for the current slice as described in U.S. Provisional Patent Application, Ser. No. 62/167,474, filed on May 28, 2015.

In another alternative, a syntax element named curr_pic_in_dpb_flag is added in PPS and the semantics of the curr_pic_as_ref_enabled_flag is modified as compared to HEVC SCC: Draft 3 as follows.

curr_pic_as_ref_enabled_flag equal to 1 specifies a picture referring to the PPS is included in a reference picture list for at least one of the slice segments of the picture itself.

curr_pic_as_ref_enabled_flag equal to 0 specifies that a picture referring to the PPS is not included any reference picture list for any slice segment of the picture itself. When not present, the value of curr_pic_as_ref_enabled_flag is inferred to be equal to 0.

The DPB operation is processed as same as the first embodiment of the proposed method 1, but the semantics of the curr_pic_as_ref_enabled_flag is changed as described above.

In addition, slice level syntax curr_pic_in_ref_list_flag is added in each slice segment header of a picture to indicate whether or not the current picture is included in a reference picture list of the picture for the current slice as described in U.S. Provisional Patent Application, Ser. No. 62/167,474, filed on May 28, 2015.

Second Method.

In this method, a picture or sub-picture memory buffer outside the DPB is used for storing the reconstructed samples before in-loop filter if the reconstructed samples are used in IBC prediction. In this method, bitstream conformance is modified as compared to the current HEVC SCC: Draft 3 so that all reference pictures shall be present in the DPB when needed for prediction except for the current picture for IBC prediction. Here the current picture is considered as a reference picture when IBC mode is enabled for decoding current slice or current picture. HEVC SCC: Draft 3 is changed (added text indicated in Italic style) as follows and no modification is needed in the operation of DPB in Annex C.3.

C.4 Bitstream Conformance

A bitstream of coded data conforming to this Specification shall fulfill all requirements specified in this clause.

. . .

7. All reference pictures except the current picture for IBC prediction which is included in a reference picture list when curr_pic_as_ref_enabled_flag equal to 1 shall be present in the DPB when needed for prediction. Each picture that has PicOutputFlag equal to 1 shall be present in the DPB at its DPB output time unless it is removed from the DPB before its output time by one of the processes specified in clause [0006].

First Embodiment

In this embodiment, an additional picture or sub-picture memory buffer outside DPB is considered for storing the reconstructed samples before in-loop filter if the reconstructed samples are used in IBC prediction in addition to the reconstructed samples after in-loop filter. The picture buffer allocated outside the DPB is the same as a picture buffer allocated inside the DPB in terms of size. In this case, the decoding process for a coded picture with nuh_layer_id equal to 0 is modified as compared to the current HEVC SCC: Draft 3 as follows accordingly, where added text is indicated in Italic style and deleted text is enclosed by an asterisk pair within a bracket pair (i.e., [*deleted text*]).

8.1.3 Decoding Process for a Coded Picture with Nuh_Layer_Id Equal to 0

. . .

The decoding process operates as follows for the current picture CurrPic:
1. The decoding of NAL units is specified in subclause 8.2.
2. The processes in subclause 8.3 specify the following decoding processes using syntax elements in the slice segment layer and above:
   Variables and functions relating to picture order count are derived in subclause 8.3.1. This needs to be invoked only for the first slice segment of a picture.
   The decoding process for RPS in subclause 8.3.2 is invoked, wherein reference pictures may be marked as "unused for reference" or "used for long-term reference". This needs to be invoked only for the first slice segment of a picture.
   When curr_pic_as_ref_enabled_flag is equal to 1, a picture or sub-picture storage buffer outside[*in*] the DPB is allocated for the current picture and the current picture is marked as "used for long-term reference".
   When the current picture is a BLA picture or is a CRA picture with NoRaslOutputFlag equal to 1, the decoding process for generating unavailable reference pictures specified in subclause 8.3.3 is invoked, which needs to be invoked only for the first slice segment of a picture.

. . .

3. The processes in subclauses 8.4, 8.5, 8.6, and 8.7 specify decoding processes using syntax elements in all syntax structure layers. It is a requirement of bitstream conformance that the coded slices of the picture shall contain slice segment data for every coding tree unit of the picture, such that the division of the picture into slices, the division of the slices into slice segments, and the division of the slice segments into coding tree units each forms a partitioning of the picture. When curr_pic_as_ref_enabled_flag is equal to 1, the decoded sample values of the current picture before in-loop filtering are stored into the picture storage buffer allocated for the current picture if the reconstructed samples are used in IBC prediction.

. . .

4. After all slices of the current picture have been decoded, the entire-current decoded picture after in-loop filtering is stored into the picture storage buffer in the DPB [*allocated for the current picture*] and is marked as "used for short-term reference".

In the above embodiment, curr_pic_as_ref_enabled_flag in SPS may be replaced with a flag of indicating whether or not the current picture is included in a reference picture list. It can be indicated that whether the current picture is included in a reference list by a syntax element named curr_pic_in_ref_list_flag present in PPS level or/and slice segment header level as described in U.S. Provisional Patent Application, Ser. No. 62/167,474, filed on May 28, 2015

In another embodiment of the second method, the bitstream conformance is modified in a way that curr_pic_in_ref_list_flag present in PPS level or/and slice segment header level is served as a flag of invoking the modified operations in the second method as compared to the curr_pic_as_ref_enabled_flag present in SPS. In other words, curr_pic_as_ref_enabled_flag in SPS in the modifications of method 2 can be replaced with curr_pic_in_ref_list_flag present in PPS level or/and slice segment header level. In the another embodiment of the second method, for example, Annex C.4 Bitstream conformance can be modified as follows, and other parts of Annexes and Sections could be modified accordingly.

C.4 Bitstream Conformance

A bitstream of coded data conforming to this Specification shall fulfil all requirements specified in this clause.

. . .

7. All reference pictures except the current picture for IBC prediction which is included in a reference picture list when curr_pic_in_ref_list_flag [*curr_pic_as_ref_enabled_flag*] equal to 1 shall be present in the DPB when needed for prediction. Each picture that has PicOutputFlag equal to 1 shall be present in the DPB at its DPB output time unless it is removed from the DPB before its output time by one of the processes specified in clause C.3.

Reference Picture List (i.e., RefPicListTemp0 Array) Construction Initialization Process In one embodiment, the process is modified such that the current picture (before loop filtering) is used as reference, and is put in the N-th position of the reference picture list (i.e., index N−1 in the list). The list can be either list 0 or list 1. The following example is provided for list 0. N can be an integer number in the range of (1, num_ref_idx_l0_active_minus1+1), inclusively. For example, N can be equal to 1 (i.e., the second position in the list, after one temporal reference picture) or N can be equal to num_ref_idx_l0_active_minus1+1 (i.e., the last position of the list).

An exemplary process is shown in the following table, where currPic refers to the current picture before in-loop filtering.

TABLE 4

The variable NumRpsCurrTempList0 is set equal to
Max( num_ref_idx_l0_active_minus1 + 1, NumPicTotalCurr ) and the list
RefPicListTemp0 is constructed as follows:
    rIdx = 0
    while( rIdx < NumRpsCurrTempList0 ) {
        for( i = 0; i < NumPocStCurrBefore && rIdx < NumRpsCurrTempList0; rIdx++, i++ ) {
            RefPicListTemp0[ rIdx ] = RefPicSetStCurrBefore[ i ]
            if(rIdx == N−1 && curr_pic_as_ref_enabled_flag )
                RefPicListTemp0[ ++rIdx ] = currPic
        }
        for( i = 0; i < NumPocStCurrAfter && rIdx < NumRpsCurrTempList0; rIdx++, i++ ) {
            RefPicListTemp0[ rIdx ] = RefPicSetStCurrAfter[ i ]
            if (rIdx == N−1 && curr_pic_as_ref_enabled_flag )
                RefPicListTemp0[ ++rIdx ] = currPic
        }
        for( i = 0; i < NumPocLtCurr && rIdx < NumRpsCurrTempList0; rIdx++, i++ ) {
            RefPicListTemp0[ rIdx ] = RefPicSetLtCurr[ i ]
            if (rIdx == N−1 && curr_pic_as_ref_enabled_flag )
                RefPicListTemp0[ ++rIdx ] = currPic
        }
    }
......

In another embodiment, the unfiltered (Deblocking and SAO filters) version of current picture is used as a possible reference picture for current slice, and it is placed at the last position of reference picture list X (X=0 or 1), when one or both of the following condition is true:

The sequence/picture/slice level flag signals that current unfiltered picture is used as a reference picture, The reference list modification for this list is not used.

An exemplary process is shown in the following table, where currPic refers to the current picture before loop filtering.

TABLE 5

```
The variable NumRpsCurrTempList0 is set equal to
Max( num_ref_idx_l0_active_minus1 + 1, NumPicTotalCurr ) and the list
RefPicListTemp0 is constructed as follows:
    rIdx = 0
    while( rIdx < NumRpsCurrTempList0 ) {
        for( i = 0; i < NumPocStCurrBefore && rIdx < NumRpsCurrTempList0;
    rIdx++, i++ ) {
            RefPicListTemp0[ rIdx ] = RefPicSetStCurrBefore[ i ]
        }
        for( i = 0; i < NumPocStCurrAfter && rIdx < NumRpsCurrTempList0;
    rIdx++, i++ ) { (8-8)
            RefPicListTemp0[ rIdx ] = RefPicSetStCurrAfter[ i ]
        }
        for( i = 0; i < NumPocLtCurr && rIdx < NumRpsCurrTempList0; rIdx++,
    i++ ) {
            RefPicListTemp0[ rIdx ] = RefPicSetLtCurr[ i ]
        }
        if( curr_pic_as_ref_enabled_flag )
            RefPicListTemp0[ rIdx++ ] = currPic (note: current unfiltered picture)
    }
```

The list RefPicList0 is constructed as follows:
for(rIdx=0; rIdx<=num_ref_idx_l0_active_minus1; rIdx++)
    RefPicList0[rIdx]=ref_pic_list_modification_flag_l0?
    RefPicListTemp0[list_entry_l0[rIdx]]: RefPicListTemp0[rIdx]
if(curr_pic_as_ref_enabled_flag && !ref_pic_list_modification_flag_l0)
    RefPicList0[num_ref_idx_l0_active_minus1]=currPic DPB Management for the Unfiltered Version of Current Picture Used as a Reference Picture First Embodiment In the reference picture list construction initialization process disclosed above, when curr_pic_as_ref_enabled_flag is equal to 1, both filtered and unfiltered versions of current picture are placed in the DPB before starting the decoding process of current picture. The following aspects are addressed:

The time to put the two pictures into DPB can be indicated by the instance that the process occurs instantaneously at the CPB removal time of access unit n (of current picture), CpbRemovalTime[n].

The current decoded picture (unfiltered) is stored in the DPB in an empty picture storage buffer, the DPB fullness is increased by one, and the current picture (unfiltered) is marked as "used for long-term reference".

The current decoded picture (filtered) is stored in the DPB in an empty picture storage buffer, the DPB fullness is increased by one, and the current picture (filtered) is marked as "used for short-term reference".

After decoding of current picture (filtered), when curr_pic_as_ref_enabled_flag is equal to 1, the unfiltered version of current picture will be removed from the DPB, while the filtered version of current picture will remain in the DPB. After the current picture is processed the filtered/unfiltered version of current picture is referred as the filtered/unfiltered version of past picture respectively. The next to be decoded picture is referred as the next current picture. The following aspects are addressed:

The time to remove the unfiltered version of past picture can be indicated by the instance that the removal of this picture from the DPB happens any time after the decoding of current picture, but has to be before decoding of the next current picture (can be after parsing the slice header of the first slice of the next current picture). One example of the removal time is immediately after decoding of the current picture, at the CPB removal time of the last decoding unit of access unit n (containing the current picture).

When the unfiltered version of past picture is removed from DPB, the DPB fullness is decreased by one.

The filtered version of past picture remains in the DPB.

In a variation of the first embodiment, before decoding the current picture (but after parsing the slice header of the first slice of the current picture), the filtered version and unfiltered version of current picture are the same if it is known that the loop filters (deblocking and SAO) are disabled for the entire picture. The operations related to the unfiltered version of current picture such as putting it into DPB and incrementing DPB fullness by one, and removing it from DPB and decrementing DPB fullness by one, is not necessary.

Second Embodiment

When curr_pic_as_ref_enabled_flag is equal to 1, the filtered version of current picture is put in the DPB in an empty picture storage buffer before starting the decoding process of current picture. While the unfiltered version of current picture is put in an empty picture storage buffer that is not counted as part of DPB. The following aspects are addressed:

The time to put the filtered version of current picture into DPB can be indicated by the instance that this process happens instantaneously at the CPB removal time of access unit n (of current picture), CpbRemovalTime[n].

The time to put the unfiltered version of current picture into an empty picture storage buffer (not stored in the DPB) can be indicated by: this process happens instantaneously at the CPB removal time of access unit n (of current picture), CpbRemovalTime[n]. The DPB fullness remains unchanged, and the current picture (unfiltered) is marked as "used for long-term reference".

The current decoded picture (filtered) is stored in the DPB in an empty picture storage buffer, the DPB fullness is increased by one, and the current picture (filtered) is marked as "used for short-term reference".

After decoding of current picture (filtered), when curr_pic_as_ref_enabled_flag is equal to 1, the unfiltered version of current picture will be removed from the picture storage buffer (not in DPB), while the filtered version of current picture will remain in the DPB. When the process moves to the next picture, the unfiltered version of current picture is referred as the unfiltered version of past picture. Similarly, the filtered version of current picture is referred as the filtered version of past picture. The next to be decoded picture is referred as the next current picture. The following aspects are addressed:

The time to remove the unfiltered version of past picture can be indicated by the instance that the removal of this picture from the the picture storage buffer (not in DPB) happens any time after the decoding of current picture, but has to be before decoding of the next current picture (can be after parsing the slice header of the first slice of the next current picture). One example of the removal time is immediately after decoding of the current picture, at the CPB removal time of the last decoding unit of access unit n (containing the current picture)

When the unfiltered version of past picture is removed from the picture storage buffer (not in DPB), the DPB fullness remains unchanged Third Embodiment When curr_pic_as_ref_enabled_flag is equal to 1, the unfiltered version of the current picture is placed in an empty picture storage buffer in the DPB, before starting the decoding process of current picture. While the filtered version of current picture is placed in an empty picture storage buffer that is not counted as part of DPB. The following aspects are addressed:

The time to put the unfiltered version of current picture into DPB can be indicated by the instance that this process happens instantaneously at the CPB removal time of access unit n (of current picture), CpbRemovalTime[n].

The current decoded picture (unfiltered) is stored in the DPB in an empty picture storage buffer, the DPB fullness is increased by one, and the current picture (unfiltered) is marked as "used for long-term reference".

The current decoded picture (filtered) is in an empty picture storage buffer (not stored in the DPB), the DPB fullness remains unchanged, and the current picture (filtered) is marked as "used for short-term reference".

After decoding of current picture (both filtered an unfiltered), when curr_pic_as_ref_enabled_flag is equal to 1, the unfiltered version of current picture will be removed from the DPB. While the filtered version of current picture will be put in the DPB. After the current picture is processed, the filtered/unfiltered version of current picture is referred as the filtered/unfiltered version of past picture respectively. The next to be decoded picture is referred as the next current picture. The following aspects are addressed in two approaches:

Approach A:

The time to remove the unfiltered version of past picture can be indicated by the instance that the removal of this picture from DPB happens any time after the decoding of current picture, but has to be before decoding of the next current picture (can be after parsing the slice header of the first slice of the next current picture). One example of the removal time is immediately after decoding of the current picture, at the CPB removal time of the last decoding unit of access unit n (containing the current picture).

When the unfiltered version of past picture is removed from DPB, the DPB fullness is decremented by one.

Right after the unfiltered version of past picture is removed from DPB, the filtered version of past picture is put into DPB, the DPB fullness is incremented by one.

Approach B:

The filtered version of current picture is put into DPB, in the position of the unfiltered version of current picture, to replace it.

The time to move the unfiltered version of past picture into DPB can be indicated by: it can happen any time after the decoding of current picture, but has to be before decoding of the next current picture (can be after parsing the slice header of the first slice of the next current picture). One example of the replace time is immediately after decoding of the current picture, at the CPB removal time of the last decoding unit of access unit n (containing the current picture).

The DPB fullness remains unchanged.

In a variation to the third embodiment, before decoding the current picture (but after parsing the slice header of the first slice of the current picture), the filtered version and unfiltered version of current picture are the same if it is known that the in-loop filters (deblocking and SAO) are disabled for the entire picture. The operations related to the unfiltered version of current picture such as, putting it into DPB and incrementing DPB fullness by one, and removing it from DPB and decrementing DPB fullness by one, is not necessary. In this case, the operations for the filtered version of current picture, can be the same as specified in the third embodiment, or the operations for the filtered version of current picture is not necessary since it is the same as the unfiltered version in this case.

In the three embodiments mentioned above, the flag curr_pic_as_ref_enabled_flag can be a sequence level, picture level or slice level flag, indicating that for a whole sequence/picture/slice, the current picture may be used as reference picture.

The identification of the situation that no in-loop filters are used for the entire picture (deblocking and SAO are disabled for the picture) can be represented in the following conditions:

The SAO filter is not used for the current picture, if one of the three cases is true:

Case 1: when sequence level SAO enable flag sample_adaptive_offset_enabled_flag is false.

Case 2: when sequence level SAO enable flag sample_adaptive_offset_enabled_flag is true, there is only once slice in the picture, and the slice header flag(s) slice_sao_luma_flag and slice_sao_chroma_flag (if chroma components exist) is(are) false.

Case 3: when sequence level SAO enable flag sample_adaptive_offset_enabled_flag is true, there are more than once slice in the picture, and the slice header flag(s) slice_sao_luma_flag and slice_sao_chroma_flag (if chroma components exist) for all slices are false.

The deblocking filter is not used for the current picture, if one of the three cases is true:

Case 1: There is only one slice in the picture, and the slice header flag slice_deblocking_filter_disabled_flag is present and is true.

Case 2: There is only one slice in the picture, the slice header flag slice_deblocking_filter_disabled_flag is not present, and the picture level pps_deblocking_filter_disabled_flag is true.

Case 3: There is more than one slice in the picture, all the slice header flag slice_deblocking_filter_disabled_flag are true when present; or when not present, the picture level pps_deblocking_filter_disabled_flag is true.

DPB Size Management for IntraBC Coded Blocks

In the first embodiment, when both filtered and unfiltered versions of current picture are placed into the DPB before the decoding of current picture, the DPB size (maxDpbPicBuf) is kept unchanged.

In the second embodiment, the filtered version of current picture is placed into the DPB before the decoding of current picture while the other hand, the unfiltered picture is not placed into DPB. Alternatively, the unfiltered version of current picture can be placed into the DPB before the decoding of current picture while the filtered picture is not put into DPB. In both cases, the maxDpbPicBuf is modified as maxDpbPicBuf—curr_pic_as_ref_enabled_flag. If curr_pic_as_ref_enabled_flag is equal to 1, one buffer is reserved for the one version that is not in DPB.

In a variation to the second embodiment, during calculating the DPB size using maxDpbPicBuf—curr_pic_as_ref_enabled_flag, the curr_pic_as_ref_enabled_flag part is also conditioned by the identification of the use of in-loop filters in the current picture. The process can be represented by the following statements:

if no filter is used for current picture, DPB size is maxDpbPicBuf;

other wise, if curr_pic_as_ref_enabled_flag is true, DPB size is maxDpbPicBuf−1 other wise, DPB size is maxDpbPicBuf

The flag curr_pic_as_ref_enabled_flag can be incorporated in a sequence level, picture level or slice level flag indicating that the current picture may be used as reference picture for a whole corresponding sequence/picture/slice.

In the third embodiment, the filtered version of current picture is placed into the DPB before the decoding of current picture while the unfiltered picture is not put into DPB. Alternatively, the unfiltered version of current picture can be placed into the DPB before the decoding of current picture while the filtered picture is not put into DPB. In both cases the maxDpbPicBuf is modified as maxDpbPicBuf−1. One buffer is reserved for the one version that is not in DPB.

FIG. 1 illustrates a flowchart of an exemplary coding system using coding modes including IntraBC mode (Intra-block copy mode) and Inter prediction mode according to an embodiment of the present invention, where two picture buffers are allocated in the decoded picture buffer (DPB) to store the reconstructed current picture after in-loop filtering and the reconstructed current picture before in-loop filtering. The system stores one or more previously reconstructed pictures after in-loop filtering in a DPB (decoded picture buffer) in step 110. A video bitstream including compressed data associated with a current picture is received in step 120. A first picture buffer is allocated in the DPB as shown in step 130 and a second picture buffer is allocated in the DPB as shown in step 140. One or more reconstructed image units associated with the current picture are derived from the video bitstream in step 150. The reconstructed image units before the in-loop filtering are stored in the first picture buffer as shown in step 160. The reconstructed image units after the in-loop filtering are stored in the second picture buffer as shown in step 170. The current reconstructed image unit is reconstructed using the reconstructed image units before the in-loop filtering in the first picture buffer to derive IBC prediction if a current reconstructed image unit is coded in the IBC mode as shown in step 180. The current reconstructed image unit is reconstructed using the previously reconstructed pictures after the in-loop filtering in the DPB to derive Inter prediction if the current reconstructed image unit is coded in the Inter prediction mode as shown in step 190.

Figure 2:
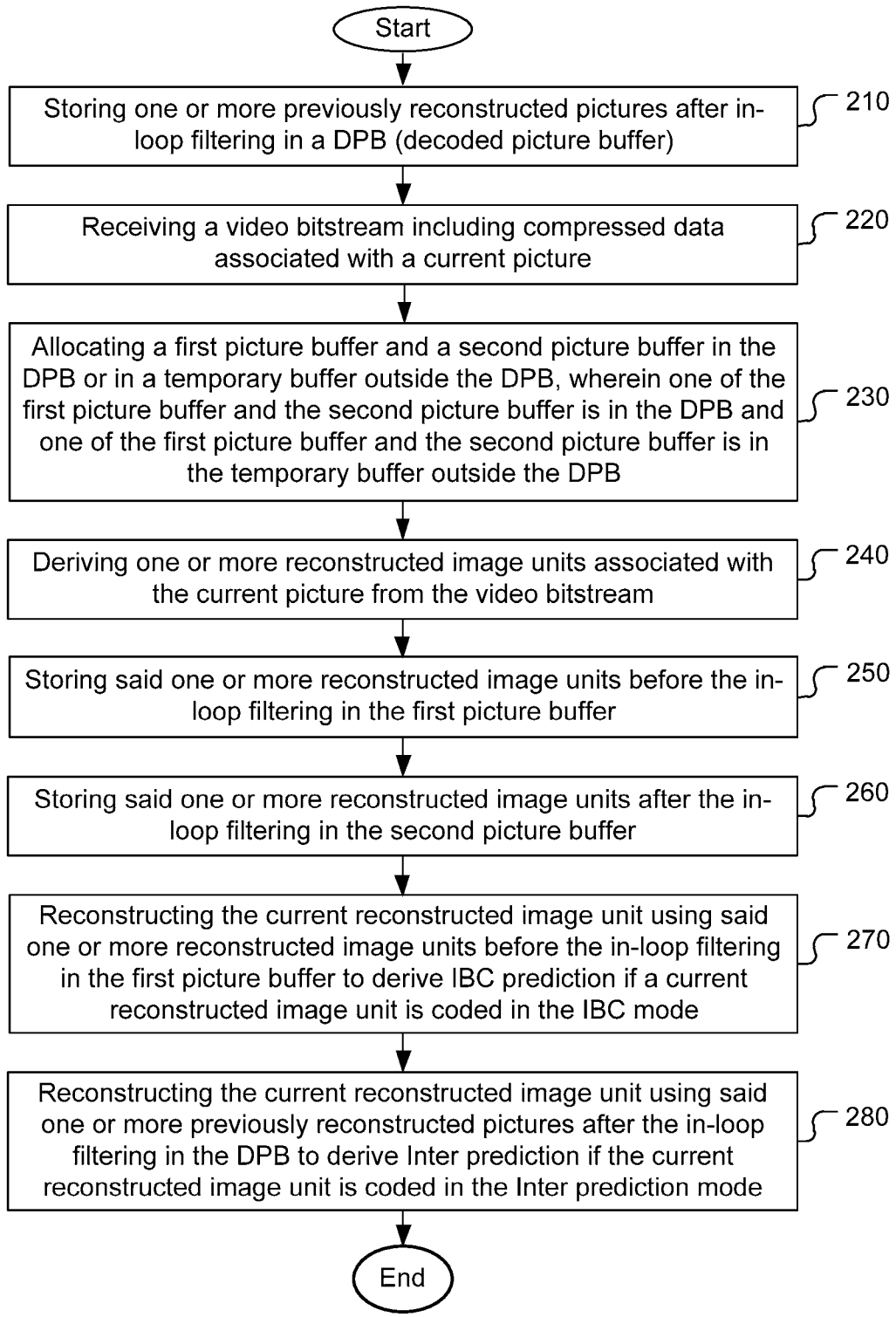
FIG. 2 illustrates a flowchart of an exemplary coding system using coding modes including IntraBC mode (Intra-block copy mode) and Inter prediction mode according to an embodiment of the present invention, where one picture buffer is allocated in the decoded picture buffer (DPB) and one picture buffer is allocated in a temporary buffer outside the DPB to store the current reconstructed picture after in-loop filtering and the current reconstructed picture before in-loop filtering.

FIG. 2 illustrates a flowchart of an exemplary coding system using coding modes including IntraBC mode (Intra-block copy mode) and Inter prediction mode according to an embodiment of the present invention, where one picture buffer is allocated in the decoded picture buffer (DPB) and one picture buffer is allocated in a temporary buffer outside the DPB to store the reconstructed current picture after in-loop filtering and the reconstructed current picture before in-loop filtering. The system stores one or more previously reconstructed pictures after in-loop filtering in a DPB (decoded picture buffer) in step 210. A video bitstream including compressed data associated with a current picture is received in step 220. A first picture buffer and a second picture buffer are allocated in the DPB or in a temporary buffer outside the DPB as shown in step 230, where one of the first picture buffer and the second picture buffer is in the DPB and one of the first picture buffer and the second picture buffer is in the temporary buffer outside the DPB. One or more reconstructed image units associated with the current picture are derived from the video bitstream in step 240. The reconstructed image units before the in-loop filtering are stored in the first picture buffer as shown in step 250. The reconstructed image units after the in-loop filtering are stored in the second picture buffer as shown in step 260. The current reconstructed image unit is reconstructed using the reconstructed image units before the in-loop filtering in the first picture buffer to derive IBC prediction if a current reconstructed image unit is coded in the IBC mode as shown in step 270. The current reconstructed image unit is reconstructed using the previously reconstructed pictures after the in-loop filtering in the DPB to derive Inter prediction if the current reconstructed image unit is coded in the Inter prediction mode as shown in step 280.

The flowcharts shown above are intended to illustrate examples of IntraBC coding and Inter coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of managing a DPB (decoded picture buffer) and decoding a video bitstream in a video decoding system, wherein the video decoding system uses coding modes including an Inter prediction mode and a Intra Block Copy (IBC) mode, comprising:
storing one or more previously reconstructed pictures after in-loop filtering in the DPB (decoded picture buffer);
receiving the video bitstream including compressed data associated with a current picture;
allocating a first picture buffer in the DPB, wherein DPB buffer fullness is incremented by one in response to allocation of the first picture buffer in the DPB;
allocating a second picture buffer in the DPB, wherein the DPB buffer fullness is incremented by one in response to allocation of the second picture buffer in the DPB;
deriving one or more reconstructed image units associated with the current picture from the video bitstream;
storing said one or more reconstructed image units before the in-loop filtering in the first picture buffer;
storing said one or more reconstructed image units after the in-loop filtering in the second picture buffer;
reconstructing a current reconstructed image unit using said one or more reconstructed image units before the in-loop filtering in the first picture buffer to derive IBC prediction if the current reconstructed image unit is coded in the IBC mode; and
reconstructing the current reconstructed image unit using said one or more previously reconstructed pictures after the in-loop filtering in the DPB to derive Inter prediction if the current reconstructed image unit is coded in the Inter prediction mode.

2. The method of claim 1, wherein said allocating the first picture buffer in the DPB and said allocating the second picture buffer in the DPB are performed before the current picture is decoded.

3. The method of claim 2, wherein the first picture buffer is marked to indicate that the first picture buffer is used for long-term reference and the second picture buffer is marked to indicate that the second picture buffer is used for short-term reference.

4. The method of claim 1, wherein the first picture buffer allocated is removed from the DPB after the current picture is reconstructed.

5. The method of claim 4, wherein the second picture buffer allocated stays in the DPB and is used as a short term reference picture for decoding of subsequent pictures.

6. The method of claim 4, wherein DPB buffer fullness is decremented by one when the first picture buffer allocated is removed from the DPB.

7. The method of claim 4, wherein a variable to indicate a maximum DPB buffer size remains to be the same as the maximum DPB buffer size specified for High Efficiency Video Coding (HEVC) Screen Content Coding (SCC) Draft 3.

8. The method of claim 1, wherein said allocating the first picture buffer in the DPB, said storing said one or more reconstructed image units before the in-loop filtering in the first picture buffer and said reconstructing the reconstructed current image unit using said one or more reconstructed image units before the in-loop filtering in the first picture buffer to derive IBC prediction if a current reconstructed image unit is coded in the IBC mode are performed only when a flag indicates that the current picture as a reference picture is enabled.

9. The method of claim 8, wherein the flag is signalled in a sequence level, picture level or slice level.

10. The method of claim 1, wherein each reconstructed image unit corresponds to one prediction unit (PU), coding unit (CU), coding tree unit (CTU), or slice.

11. The method of claim 1, wherein a variable to indicate a maximum DPB buffer size is subtracted by a value of a syntax element specifying whether the current picture is enabled to be used as a reference picture for the current picture, where the value equal to one specifies that the IBC mode is enabled for the current picture.

12. The method of claim 1, further comprising determining if the in-loop filtering is disabled for the current picture, storing only said one or more reconstructed image units before the in-loop filtering in the first picture buffer if the in-loop filter is disabled.

13. A method of managing a DPB (decoded picture buffer) and decoding a video bitstream in a video decoding system, wherein the video decoding system uses coding modes including an Inter prediction mode and a Intra Block Copy (IBC) mode, comprising:
storing one or more previously reconstructed pictures after in-loop filtering in the DPB (decoded picture buffer);
receiving the video bitstream including compressed data associated with a current picture;
allocating a first picture buffer and a second picture buffer in the DPB or in a temporary buffer outside the DPB, wherein one of the first picture buffer and the second picture buffer is in the DPB and one of the first picture buffer and the second picture buffer is in the temporary buffer outside the DPB;

deriving one or more reconstructed image units associated with the current picture from the video bitstream;

storing said one or more reconstructed image units before the in-loop filtering in the first picture buffer;

storing said one or more reconstructed image units after the in-loop filtering in the second picture buffer;

reconstructing a current reconstructed image unit using said one or more reconstructed image units before the in-loop filtering in the first picture buffer to derive IBC prediction if the current reconstructed image unit is coded in the IBC mode; and reconstructing the current reconstructed image unit using said one or more previously reconstructed pictures after the in-loop filtering in the DPB to derive Inter prediction if the current reconstructed image unit is coded in the Inter prediction mode, wherein if the first picture buffer is allocated in the DPB, the first picture buffer allocated is removed from the DPB after the current picture is reconstructed, wherein the second picture buffer is placed into the DPB after the current picture is reconstructed.

14. The method of claim 13, wherein said allocating the first picture buffer and the second picture buffer in the DPB or in the temporary buffer outside the DPB are performed before the current picture is decoded.

15. The method of claim 13, wherein if the first picture buffer is allocated in the temporary buffer outside the DPB, the first picture buffer is removed from the temporary buffer after the current picture is reconstructed.

16. The method of claim 15, wherein the second picture buffer allocated stays in the DPB after the current picture is reconstructed.

17. The method of claim 13, wherein a variable to indicate a maximum DPB buffer size is subtracted by a value of a syntax element specifying whether the current picture is enabled to be used as a reference picture for the current picture, where the value equal to one specifies that the IBC mode is enabled for the current picture.

18. The method of claim 13, wherein each reconstructed image unit corresponds to one prediction unit (PU), coding unit (CU), coding tree unit (CTU) or slice.

19. The method of claim 13, wherein allocating a first picture buffer and a second picture buffer in the DPB or in a temporary buffer outside the DPB, said storing said one or more reconstructed image units before the in-loop filtering in the first picture buffer, and said reconstructing the reconstructed current image unit using said one or more reconstructed image units before the in-loop filtering in the first picture buffer to derive IBC prediction if a current reconstructed image unit is coded in the IBC mode are performed only when a flag indicates that the current picture as a reference picture is enabled.

20. The method of claim 19, wherein the flag is signalled in a sequence level, picture level or slice level.

21. An apparatus for managing a DPB (decoded picture buffer) and decoding a video bitstream in a video decoding system, wherein the video decoding system uses coding modes including an Inter prediction mode and a Intra Block Copy (IBC) mode, comprising one or more electronic circuits arranged to:

store one or more previously reconstructed pictures after in-loop filtering in the DPB (decoded picture buffer);

receive the video bitstream including compressed data associated with a current picture;

allocate a first picture buffer in the DPB, wherein DPB buffer fullness is incremented by one in response to allocation of the first picture buffer in the DPB;

allocate a second picture buffer in the DPB, wherein the DPB buffer fullness is incremented by one in response to allocation of the second picture buffer in the DPB;

derive one or more reconstructed image units associated with the current picture from the video bitstream;

store said one or more reconstructed image units before the in-loop filtering in the first picture buffer;

store said one or more reconstructed image units after the in-loop filtering in the second picture buffer;

if a current reconstructed image unit is coded in the IBC mode, reconstruct the current reconstructed image unit using said one or more reconstructed image units before the in-loop filtering in the first picture buffer to derive IBC prediction; and if the current reconstructed image unit is coded in the Inter prediction mode, reconstruct the current reconstructed image unit using said one or more previously reconstructed pictures after the in-loop filtering in the DPB to derive Inter prediction.

22. An apparatus for managing a DPB (decoded picture buffer) and decoding a video bitstream in a video decoding system, wherein the video decoding system uses coding modes including an Inter prediction mode and a Intra Block Copy (IBC) mode, comprising one or more electronic circuits arranged to:

store one or more previously reconstructed pictures after in-loop filtering in the DPB (decoded picture buffer);

receive the video bitstream including compressed data associated with a current picture;

allocate a first picture buffer and a second picture buffer in the DPB or in a temporary buffer outside the DPB, wherein one of the first picture buffer and the second picture buffer is in the DPB and one of the first picture buffer and the second picture buffer is in the temporary buffer outside the DPB;

derive one or more reconstructed image units associated with the current picture from the video bitstream;

store said one or more reconstructed image units before the in-loop filtering in the first picture buffer;

store said one or more reconstructed image units after the in-loop filtering in the second picture buffer;

if a current reconstructed image unit is coded in the IBC mode, reconstruct the current reconstructed image unit using said one or more reconstructed image units before the in-loop filtering in the first picture buffer to derive IBC prediction; and if the current reconstructed image unit is coded in the Inter prediction mode, reconstruct the current reconstructed current image unit using said one or more previously reconstructed pictures after the in-loop filtering in the DPB to derive Inter prediction, wherein if the first picture buffer is allocated in the DPB, the first picture buffer allocated is removed from the DPB after the current picture is reconstructed, wherein the second picture buffer is placed into the DPB after the current picture is reconstructed.

* * * * *